(12) United States Patent
Romano

(10) Patent No.: US 7,441,496 B2
(45) Date of Patent: Oct. 28, 2008

(54) THEMATIC WAFFLE AND SANDWICH COOKING PLATE SYSTEM

(76) Inventor: Mary F. Romano, 8912 E. Pinnacle Peak Rd., #452, Scottsdale, AZ (US) 85255

( * ) Notice: Subject to any disclaimer, the term of this patent is extended or adjusted under 35 U.S.C. 154(b) by 839 days.

(21) Appl. No.: 10/738,520

(22) Filed: Dec. 16, 2003

(65) Prior Publication Data
US 2004/0129148 A1  Jul. 8, 2004

Related U.S. Application Data

(60) Provisional application No. 60/434,139, filed on Dec. 16, 2002.

(51) Int. Cl.
*A47J 37/00* (2006.01)
(52) U.S. Cl. .............. 99/388; 99/349; 99/372; 99/378
(58) Field of Classification Search ........... 99/325–333, 99/385–393, 450, 372–384, 349–351; 219/521–525, 219/478; 426/523
See application file for complete search history.

(56) References Cited

U.S. PATENT DOCUMENTS

| | | | | | |
|---|---|---|---|---|---|
| 1,892,117 | A | * | 12/1932 | Perkins | 99/388 |
| 2,483,669 | A | * | 10/1949 | Reid | 219/478 |
| 4,290,349 | A | * | 9/1981 | Fiorenza | 99/388 |
| 4,656,927 | A | * | 4/1987 | Mosby et al. | 99/388 |
| 5,156,637 | A | * | 10/1992 | Wai-Ching | 99/388 |
| 5,664,481 | A | * | 9/1997 | Huggler | 99/328 |
| 5,943,948 | A | * | 8/1999 | Tanaka | 99/388 |
| 6,112,648 | A | * | 9/2000 | Origane | 99/388 |
| 2006/0180033 | A1 | * | 8/2006 | Pan et al. | 99/388 |

\* cited by examiner

*Primary Examiner*—Timothy F. Simone
(74) *Attorney, Agent, or Firm*—Stoneman Volk Patent Group; Martin L. Stoneman; Michael D. Volk, Jr.

(57) ABSTRACT

A method and system for designing, manufacturing and selling thematic cooking plates that are interchangeable with removable cooking plates in various waffle irons, sandwich grillers and waffle iron/sandwich griller combinations. The cooking plates may have a pattern on one or both sides. The plates may be packaged in a variety of combinations, but most often as a group of three cooking plates each with different patterns representing a single theme.

6 Claims, 4 Drawing Sheets

THEMATIC WAFFLE AND SANDWICH COOKING PLATE SYSTEM

CROSS-REFERENCE TO RELATED APPLICATION

The present application is related to prior provisional application Ser. No. 60/434,139, filed Dec. 16, 2002, entitled "THEMATIC WAFFLE AND SANDWICH COOKING PLATE SYSTEM", the contents of which are incorporated herein by this reference and are not admitted to be prior art with respect to the present invention by the mention in this cross-reference section.

BACKGROUND

This invention relates to providing a system and method for providing themed, interchangeable cooking surfaces for waffle and sandwich-griller appliances to consumers, such provision being independent of the provision of a matching manufacturer's appliance.

Typically, waffle and sandwich-griller appliances are sold with permanently attached or removable cooking plates. Often, the appliances with removable cooking plates are intended to meet one or two common objectives. The first common objective is to allow easy cleaning and avoid subjecting the appliance's electrical components to undue moisture or water. A second common objective is to allow the appliance to serve more than one purpose, e.g., as a waffle griller, a sandwich griller or a griddle. Typically, the cooking plates are removable, and some are reversible with each respective cooking plate having at least one, and possibly two, cooking surfaces. For example, one cooking surface typically has a waffle pattern and a second opposing cooking surface has a smooth cooking surface on the opposite side of the cooking plate, allowing easy conversion from a waffle griller to a sandwich griller.

A few manufacturers have offered waffle grillers or sandwich grillers with built-in cooking surfaces that have a pictorial pattern. But there remains a need for removable cooking plates with themed cooking surfaces that are compatible and interchangeable with selected removable cooking plates for waffle and sandwich griller appliances from selected manufacturers.

OBJECTS OF THE INVENTION

A primary object and feature of the present invention is to provide a system and method of removable cooking plates with themed cooking surfaces that are compatible and interchangeable with selected removable cooking plates for waffle and sandwich griller appliances from selected manufacturers.

It is a further object and feature of the present invention to provide such a system and method for making and selling sets, having a single theme, of removable cooking plates with cooking surfaces. It is a further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides an impression system for transferring heat and at least one image representation to at least one food substance, for use with at least one cooking system of at least one manufacturer, comprising: impressor means, comprising at least one image representation, for impressing the at least one food substance; adapter means for adapting such impressor means to the at least one cooking system of the at least one manufacturer; and heat-transfer means for transferring heat from the at least one cooking system of the at least one manufacturer to the at least one food substance; wherein such at least one image representation comprises three-dimensional pattern transfer means for transferring at least one three-dimensional pattern onto the at least one food substance; and wherein such three-dimensional pattern transfer means comprises at least one motif.

Moreover, it provides such an impression system wherein such impressor means comprises at least one cooking plate comprising at least one first side and at least one second side. Additionally, it provides such an impression system wherein such at least one first side comprises such three-dimensional pattern transfer means. Also, it provides such an impression system wherein such at least one first side and such at least one second side each comprise such negative three-dimensional pattern transfer means. In addition, it provides such a impression system wherein such impressor means comprises at least two of such at least one cooking plate, each respective such at least one cooking plate comprising one motif. And, it provides such an impression system further comprising release means for releasing the at least one food substance from such impressor means.

In accordance with another preferred embodiment hereof, this invention provides an impression system for transferring heat and at least one image representation to at least one food substance, for use with at least one cooking system of at least one manufacturer, comprising: at least one impressor, comprising at least one image representation, adapted to impress the at least one food substance; at least one adapter structured and arranged to adapt such impressor to the at least one cooking system of the at least one manufacturer; and at least one heat-transferor adapted to transfer heat from the at least one cooking system of the at least one manufacturer to the at least one food substance; wherein such at least one image representation comprises at least one three-dimensional pattern adapted to transfer at least one three-dimensional pattern onto the at least one food substance; and wherein such at least one three-dimensional pattern comprises at least one motif.

Further, it provides such an impression system wherein such impressor is removably attachable to the at least one cooking system of the at least one manufacturer. Even further, it provides such an impression system wherein such at least one impressor is adapted to essentially utilize at least one portion of at least one original system of attachments of the at least one cooking system. Moreover, it provides such an impression system wherein such at least one impressor comprises at least one cooking plate comprising at least one first side and at least one second side.

Additionally, it provides such an impression system wherein such at least one first side comprises such at least one three-dimensional pattern. Also, it provides such an impression system wherein such at least one first side and such at least one second side each comprises such at least one three-dimensional pattern. In addition, it provides such an impression system wherein such at least one impressor comprises at least two of such at least one cooking plates, each such at least one cooking plates comprising the same motif. And, it provides such an impression system further comprising at least one release surface adapted to release the at least one food substance from such at least one impressor.

In accordance with another preferred embodiment hereof, this invention provides a kit for providing an impression system for transferring heat and at least one image representation to at least one food substance, for use with at least one cooking system of at least one manufacturer, comprising: an impression system comprising at least one impressor, comprising at least one image representation, adapted to impress the at least one food substance, at least one adapter structured and arranged to adapt such impressor to the at least one cooking system of the at least one manufacturer, and at least one heat-transferor adapted to transfer heat from the at least one cooking system of the at least one manufacturer to the at least one food substance, wherein such at least one image representation comprises at least one three-dimensional pattern adapted to transfer at least one three-dimensional pattern onto the at least one food substance, and wherein such at least one three-dimensional pattern comprises at least one motif; instructions to instruct at least one user on usage of such impression system; at least one kit package to contain kit contents; and indicia to indicate at least one model of at least one manufacturer's cooking appliance. Further, it provides such a kit wherein such impression system comprises a plurality of cooking plates, each such plurality of cooking plates comprising at least one different image representation of a single motif.

In accordance with another preferred embodiment hereof, this invention provides a manufacturing and distribution method for providing themed removable cooking plates for at least one manufacturer's cooking appliance to consumers comprising the steps of: selecting at least one manufacturer's cooking appliance brand and model with at least one removable plate; selecting at least one cooking surface motif; selecting at least one compatible image for each selected at least one cooking surface motif; preparing cooking plate manufacturing specifications for each at least one compatible image and at least one manufacturer's cooking appliance brand and model combination; specifying contents of at least one consumer purchasable package having at least one cooking plate bearing such at least one compatible image for each selected at least one cooking surface motif; and making and selling to consumers cooking plates each bearing such at least one compatible image for each selected at least one cooking surface motif. Even further, it provides such a method wherein the step of preparing cooking plate manufacturing specifications for each image and model combination further comprises the steps of: specifying preferred metal composition of the at least one cooking plate; specifying preferred non-stick coating for at least one cooking surface of the at least one cooking plate; specifying dimensions of each at least one cooking plate; and specifying images to be included in each selected at least one motif.

Even further, it provides such a manufacturing and distribution method wherein the at least one such manufacturer's cooking appliance comprises a waffle-maker. Even further, it provides such a manufacturing and distribution method wherein the at least one such manufacturer's cooking appliance comprises a sandwich-maker.

DETAILED DESCRIPTION OF THE BEST MODE AND PREFERRED EMBODIMENTS OF THE INVENTION

According to a preferred embodiment of the present invention, a method and system is described for thematic cooking plates (i.e., cooking plates able to impress upon the cooked food an image having a selected motif) that are interchangeable with removable cooking plates in various waffle irons, sandwich grillers and waffle iron/sandwich griller combinations. Further, methods for the design, manufacture and sale of the thematic cooking plates to consumers are addressed by a preferred embodiment of the present invention.

Figure 1:
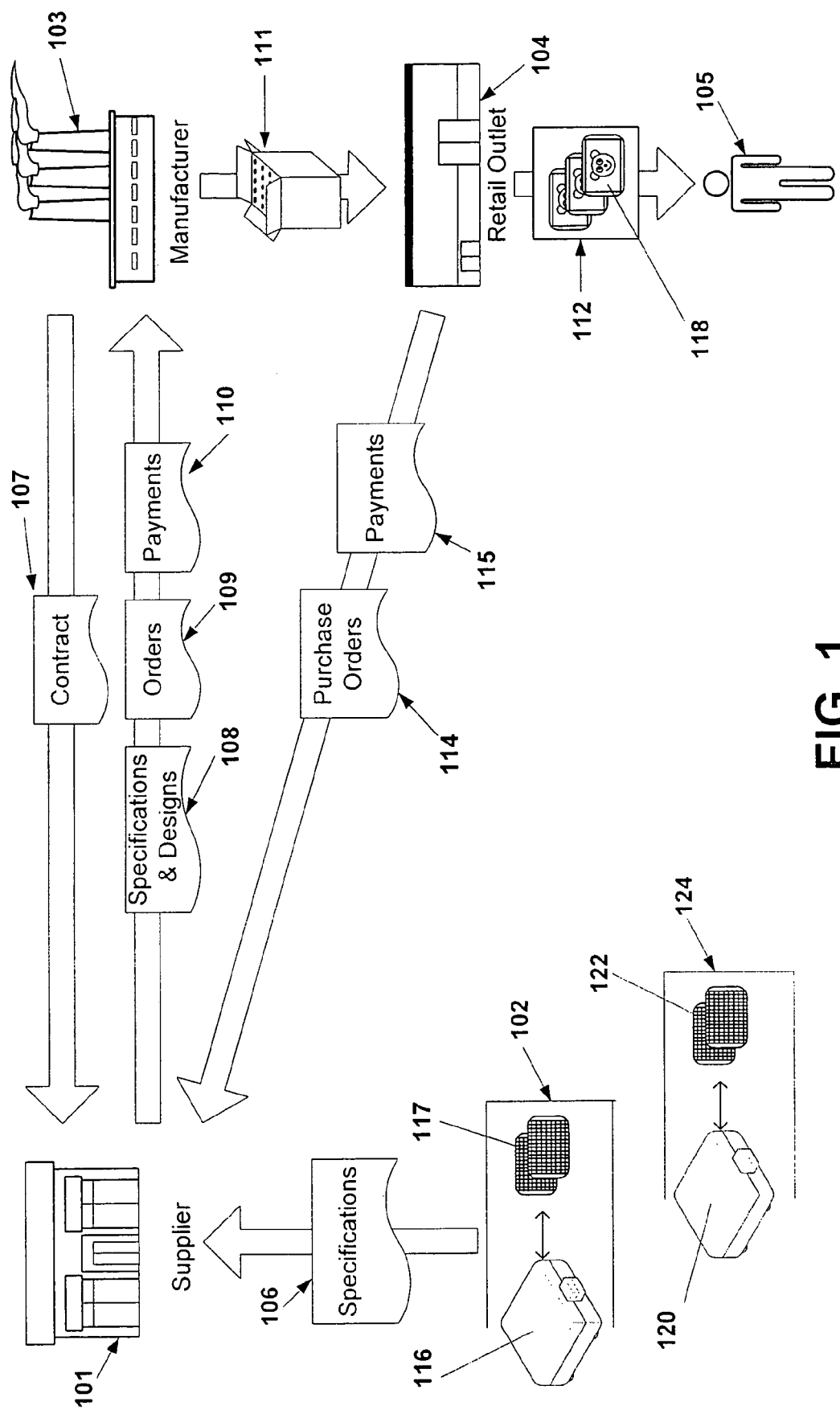
FIG. 1 is a diagrammatic view of a system and method for making and selling themed interchangeable cooking plates for waffle grillers and sandwich grillers according to a preferred embodiment of the present invention.

FIG. 1 is a diagrammatic view of a system and method for making and selling themed interchangeable cooking plates for waffle grillers and sandwich grillers according to a preferred embodiment of the present invention. Referring to FIG. 1, the preferred method of business is presented in summary. Each of the key aspects of the preferred method of business is described.

In a first preferred step, Supplier 101 identifies manufacturers that provide waffle irons (embodying herein wherein the at least one such manufacturer's cooking appliance comprises a waffle-maker), sandwich grillers or waffle/sandwich griller combination appliances 102 (hereinafter referred to as "appliance 102") with removable cooking plates 117 (embodying herein selecting at least one manufacturer's cooking appliance brand and model with at least one removable plate). Preferably, appliance 102 includes removable cooking plates 117 which are reversible, each plate having two sides to allow appliance 102 to be converted from a waffle iron to a sandwich griller. Preferably, Supplier 101 will determine which particular manufacturer's appliance(s) 102 offer the best potential market opportunity for removable thematic (each having a particular motif to be impressed into the food during heating) interchangeable impressors, molds or cooking plates 118 to be preferably sold through retail outlets 104 as an after-market item independent of the original appliance manufacturer. Upon reading this specification, those with ordinary skill in the art will understand that, under appropriate circumstances, such as new market trends, user preference, advances in technology, etc., other sales arrangements, such as, for example, sales occurring through mail order or TV programs like "QVC" or over the Internet, etc., may suffice.

Preferably, simultaneously, Supplier 101 will select motifs or themes to be used for the cooking plate packages 112. Preferably, particular images, which represent the selected single themes, will be chosen and designs completed for a variety of patterns for the cooking plates 118 (embodying herein selecting at least one cooking surface motif; and embodying herein selecting at least one compatible image for each selected at least one cooking surface motif). As one possible example, supplier 101 may select a motif comprising cooking plates containing images of popular children's characters. Upon reading this specification, those with ordinary skill in the art will understand that, under appropriate circumstances, considering such issues as user preference, societal and cultural context, etc., a selected motif may comprise any conceivable subject matter, such as, for example, historical motifs (both real and fanciful), religious motifs, political motifs, motifs depicting abstract and/or concrete concepts, etc.

Preferably, through examination and research, Supplier 101 determines the preferred specifications 106 of each appliance 102, such as dimensions, metal used, type of non-stick surface used, and method of attachment to the appliance body 116 for each respective removable cooking plate 117 (embodying herein preparing cooking plate manufacturing specifications for each at least one compatible image and at least one manufacturer's cooking appliance brand and model combination).

Preferably, Supplier 101 will identify and negotiate contract 107 with manufacturer 103 capable of producing the cooking plates 118 based on the specifications and designs 108 (hereinafter referred to as "specifications 108") provided by the Supplier 101.

Preferably, specifications 108 will include physical dimensions, materials requirements, patterns to be produced, packaging materials, user instructions and specific patterns and quantities to be included in each consumer cooking plate package 112 (embodying herein specifying contents of at least one consumer purchasable package). Preferably, each set of specifications 108 provides specifying preferred metal composition, preferred non-stick coating for the cooking surface, preferred dimensions of each cooking plate, and preferred images to be included in each selected theme (embodying herein specifying preferred metal composition of the at least one cooking plate; specifying preferred non-stick coating for cooking surface of the at least one cooking plate; specifying dimensions of each at least one cooking plate; and specifying images to be included in each selected at least one motif).

Preferably, at the conclusion of contract negotiations, Supplier 101 will preferably provide manufacturer 103 the specifications 108, estimated production quantities and estimated delivery dates for cooking plate packages 112 to a retail outlet 104. Upon reading this specification, those with ordinary skill in the art will understand that, under appropriate circumstances, such as economics, manufacturing problems, etc., other arrangements, such as, for example, direct manufacturing of cooking plates/packaging by the Supplier, may suffice.

Supplier 101 will preferably solicit orders from retail outlets 104 for cooking plate packages 112. Supplier 101 will preferably solicit retail outlets 104 that offer the appliance 102 (on which the cooking plates 118 are based) for sale. Upon reading this specification, those with ordinary skill in the art will understand that, under appropriate circumstances, such as economy, location, and marketing, it may suffice to solicit retail outlets to carry cooking plate packages 112 even if such outlets do not offer the appliances 102. Supplier 101 will preferably receive purchase orders 114 from a variety of retail outlets 104 specifying quantities of particular cooking plate packages 112 and desired delivery dates. On receipt of retail outlet 104 purchase orders, Supplier 101 will preferably provide specific production quantities of particular cooking plate packages 112 and desired delivery dates (such manufacture and sales embodying herein the step of making and selling to consumers cooking plates each bearing such at least one compatible image for each selected at least one cooking surface motif).

Finally, retail outlets 104 will preferably remit payment to Supplier 101 on receipt of the ordered cooking plate packages 112. In turn, Supplier 101 will preferably remit payment to manufacturer 103 on confirmation of delivery to specified retail outlets 104. Upon reading this specification, those with ordinary skill in the art will understand that, under appropriate circumstances, such as credit, marketing, distance, etc., alternate ordering and payment methods and sequences of steps may suffice between Supplier 101, manufacturers 103 and retail outlets 104.

Under appropriate circumstances, alternate preferred forms of retail distribution including, but not limited to, e-commerce through the Internet, television-based home shopping, catalog and mail order may also be used.

Thus, it is seen that the above steps embody and provide herein a manufacturing and distribution method for providing themed removable cooking plates for at least one manufacturer's cooking appliance to consumers comprising the steps of: selecting at least one manufacturer's cooking appliance brand and model with at least one removable plate; selecting at least one cooking surface motif; selecting at least one compatible image for each selected at least one cooking surface motif; preparing cooking plate manufacturing specifications for each at least one compatible image and at least one manufacturer's cooking appliance brand and model combination; specifying contents of at least one consumer purchasable package having at least one cooking plate bearing such at least one compatible image for each selected at least one cooking surface motif; and making and selling to consumers cooking plates each bearing such at least one compatible image for each selected at least one cooking surface motif. And the above (see FIG. 1) further embodies wherein the step of preparing cooking plate manufacturing specifications for each image and model combination further comprises the steps of: specifying preferred metal composition of the at least one cooking plate; specifying preferred non-stick coating for at least one cooking surface of the at least one cooking plate; specifying dimensions of each at least one cooking plate; and specifying images to be included in each selected at least one motif. And it embodies such a method wherein the at least one said manufacturer's cooking appliance comprises a waffle-maker.

Figure 2:
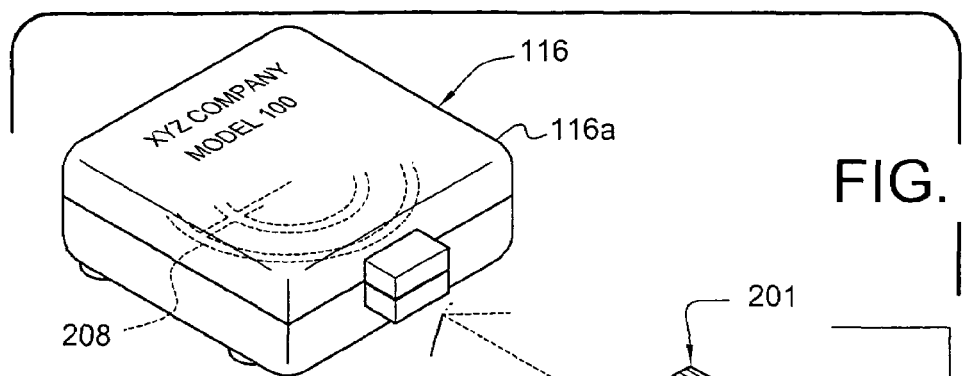
FIG. 2 is a perspective view of a waffle or sandwich griller and a single-sided-cooking-surface removable cooking plate according to a preferred embodiment of the present invention.

FIG. 2 is a perspective view of a waffle or sandwich griller and a single-sided-cooking-surface removable cooking plate according to a preferred embodiment of the present invention.

FIG. 2 illustrates single-sided-cooking-surface cooking plate 201 for use preferably in appliances 116 which accept single-sided-cooking-surface cooking plates 201. For the purpose of illustration, the appliance 116 of FIG. 2 is depicted as waffle-maker 116a. Preferably, single-sided-cooking-surface cooking plate 201 (embodying herein at least one impressor) comprises a patterned first surface 205 having at least one negative three-dimensional pattern 206 which, when pressed against a moldable or impressable substance such as a sandwich or waffle mix, creates an impression in the form of image representation 204 in the substance (embodying herein impressor means, comprising at least one image representation, for impressing the at least one food substance; and, embodying herein at least one impressor, comprising at least one image representation, adapted to impress the at least one food substance).

Preferably, negative three-dimensional pattern 206 is integrally molded within top surface 205 of cooking plate 201 and is preferably adapted to form a positive three-dimensional pattern (see FIG. 5A) onto the impressionable substance which is most preferably food (embodying herein wherein such at least one image representation comprises three-dimensional pattern transfer means for transferring at least one three-dimensional pattern onto the at least one food substance; and embodying herein wherein such at least one image representation comprises at least one three-dimensional pattern adapted to transfer at least one three-dimensional pattern onto the at least one food substance). Upon reading this specification, those with ordinary skill in the art will understand that, under appropriate circumstances, such as specific theme subjects, user preference, changes in technology, etc., other plate surface arrangements, such as, for example, a positive three-dimensional pattern transfer, which transfers a negative three-dimensional pattern onto the food, may suffice.

Although single-sided-cooking-surface cooking plate 201 comprises two surfaces (herein embodying wherein such impressor means comprises at least one cooking plate comprising at least one first side and at least one second side), only top surface 205 has a negative three-dimensional pattern (embodying herein wherein such at least one first side comprises such three-dimensional pattern transfer means; and embodying herein wherein such at least one first side comprises such at least one three-dimensional pattern) and a single theme or motif (embodying herein wherein such at least one three-dimensional pattern comprises at least one motif; and embodying herein wherein such three-dimensional pattern transfer means comprises at least one motif; and embodying herein wherein such at least one first side and such at least one second side each comprises such at least one three-dimensional pattern). Preferably, second surface 207 is adapted to engage with and transfer heat from heating element 208 within waffle-maker 116a or other such similar appliances 116 in a manner consistent with the original manufacturer's plate.

Preferably, each respective cooking plate 201 transfers heat such that the impressionable substance is heated to a preferred cooking temperature (embodying herein heat-transfer means for transferring heat from the at least one cooking system of the at least one manufacturer to the at least one food substance; and, embodying herein at least one heat-transferor adapted to transfer heat from the at least one cooking system of the at least one manufacturer to the at least one food substance). Further, each respective removable cooking plate 201 is manufactured to the specifications of the respective griddle or appliance 116 such that it is adapted to be readily attachable to the respective appliance (embodying herein adapter means for adapting such impressor means to the at least one cooking system of the at least one manufacturer; and, embodying herein at least one adapter structured and arranged to adapt such impressor to the at least one cooking system of the at least one manufacturer). For example, cooking plate 201 is preferably adapted to utilize the original manufacturer's preferred system of attachments, such as clips, grooves, tabs and other well-known attachments used in the art (herein embodying wherein such at least one impressor is adapted to essentially utilize at least one portion of at least one original system of attachments of the at least one cooking system). In light of the teachings herein, those knowledgeable in such attachment art will easily derive other attachment methods without undue experimentation.

A package 112 may preferably comprise one single-sided-cooking-surface cooking plate 201 for appliance 116, as shown. A user may preferably select and use only one single-sided-cooking-surface cooking plate 201 for a variety of reasons including, but not limited to, replacement of single-sided-cooking-surface cooking plate(s) 201 from other theme combinations, additional patterns for previously (or currently) offered themes and as a low cost alternative to multiple pattern combinations. Also illustrated is an alternative use of one single-sided-cooking-surface cooking plate 201 in which one single-sided-cooking-surface cooking plate 201 replaces only one of the original manufacturer's pair of single-sided-cooking-surface cooking plates.

Figure 3:
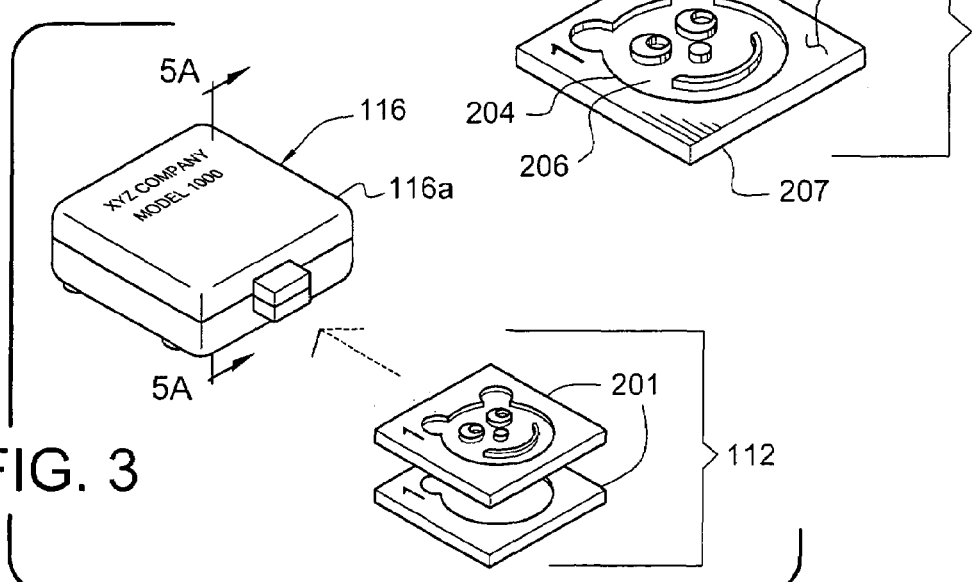
FIG. 3 is a perspective view of a waffle or sandwich griller with two single-sided-cooking-surface removable cooking plates according to a preferred embodiment of the present invention.
Figure 4:
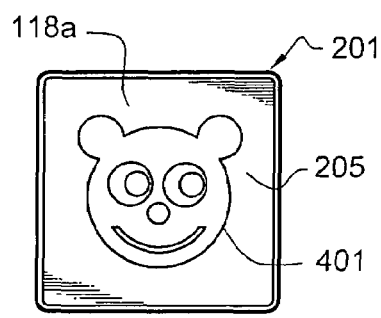
FIG. 4 is a top view of a first surface of a single-sided themed cooking plate according to the preferred embodiment of FIG. 3.

FIG. 3 is a perspective view of a waffle or sandwich griller with two single-sided-cooking-surface removable cooking plate(s) 201 according to a preferred embodiment of the present invention. Referring to FIG. 3, a preferred single-cooking-surface cooking plate 201 combination is presented, in which two or more single-sided-cooking-surface cooking plates 201 are packaged together and sold for use preferably in appliance(s) 116 that accept removable single-sided-cooking-surface cooking plates 201. Preferably, the cooking surface pattern of each single-sided-cooking-surface cooking plate 201 provided in package 112 will represent the same theme (embodying herein wherein such at least one impressor comprises at least two of such at least one cooking plate, each such at least one cooking plate comprising the same motif). For example, a preferred package 112 having, say, a cartoon character motif may preferably include three cooking plates which have cooking surface patterns representing a cartoon cat, a cartoon dog (such as shown in FIG. 4) and a cartoon mouse. Under appropriate circumstances, other preferred motifs and preferred theme-related representational patterns may be designed and sold for appliances 116 which accept removable single-sided-cooking-surface cooking plates. Preferably, any one or a combination of any two single-sided-cooking-surface cooking plates 201 replaces the original manufacturer's single-sided-cooking-surface cooking plates.

It is noted that more, or fewer, single-sided-cooking-surface cooking plates 201 may be included in package 112. Additionally, upon reading this specification, those with ordinary skill in the art will understand that, under appropriate circumstances, such as user preference, etc., other package arrangements, such as, for example, providing cooking surface patterns comprising different themes in a single package may suffice.

FIG. 4 is a top view of first surface pattern 401 of single-sided themed cooking plate 201 of FIG. 3 according to a preferred embodiment of the present invention. Preferably, first surface 205 comprises non-stick coating 118a to assist in releasing the food from first surface 205 and to assist cleaning of single-sided themed cooking plate 201. Preferably, all plates comprise non-stick coating 118a (embodying herein release means for releasing the at least one food substance from such impressor means; and, embodying herein at least one release surface adapted to release the at least one food substance from such at least one impressor), as shown.

Figure 5:
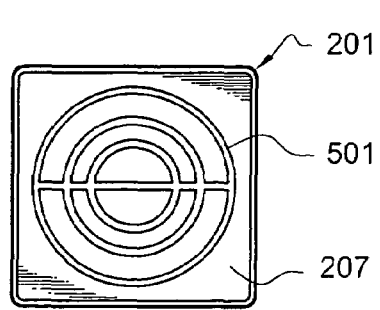
FIG. 5 is a top view of a second surface of a single-sided themed cooking plate according to the preferred embodiment of FIG. 3.
Figure 5A:
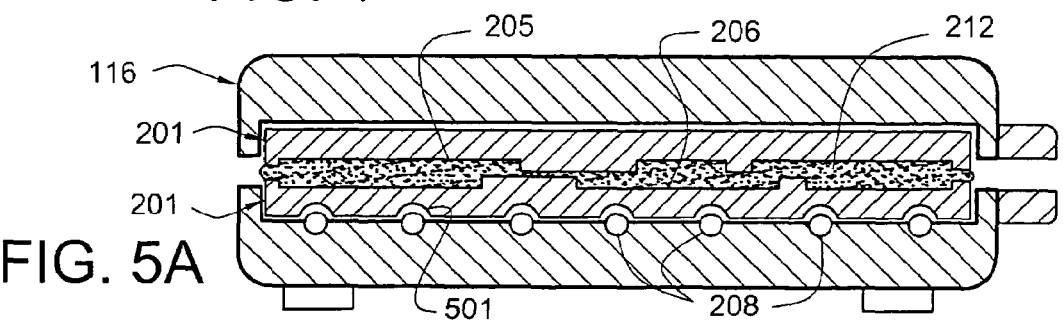
FIG. 5A is a sectional view, through the section 5A of FIG. 3, illustrating a waffle or sandwich griller containing the two single-sided-cooking-surface removable cooking plates.

FIG. 5 is a top view of second surface-heating pattern 501 of single sided themed cooking plate 201 of FIG. 3. Certain removable cooking plates 201 comprise a second surface 207 adapted to closely fit heating element 208 of appliance 116 (as shown in FIG. 5A). The original plate manufacturers utilize this adaptation to efficiently transfer heat from heating element 208 to cooking plate 201, as shown. To maintain a high level of compatibility, cooking plate 201 may, under appropriate circumstances, utilize a similar recessed second surface-heating pattern 501 integrally molded into second surface 207 of cooking plate 201, as shown.

FIG. 5A is a sectional view through the section 5A of FIG. 3 illustrating appliance 116 containing the two single-sided cooking surface removable cooking plate(s) 201. Preferably, negative three-dimensional pattern 206 located within top surface 205 of cooking plate 201 is preferably adapted to form a positive three-dimensional pattern onto impressionable substance 212 which is most preferably a food such as a sandwich or waffle mix, as shown.

Figure 6:
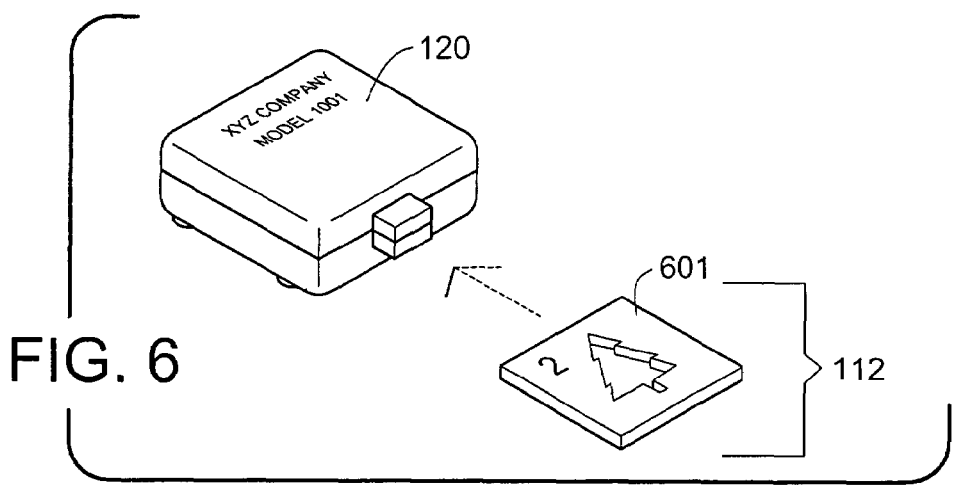
FIG. 6 is a perspective view of a waffle or sandwich griller and one double-sided-cooking-surface removable cooking plate according to a preferred embodiment of the present invention.

FIG. 6 is a perspective view of a waffle or sandwich griller and one double-sided cooking surface removable cooking plate 601 according to a preferred embodiment of the present invention (embodying herein wherein such at least one first side and such at least one second side each comprise such negative three-dimensional pattern transfer means). FIG. 6 illustrates a preferred alternate embodiment to provide one double-sided-cooking-surface cooking plate 601 for use in appliance 120 which will accept single cooking plate(s) 601 that have two cooking surfaces. In a preferred embodiment of the present invention, package 112 contains a single double-sided-cooking-surface cooking plate 601 for such appliance 120. A user may preferably select and use only one double-sided-cooking-surface cooking plate 601 for a variety of reasons including, but not limited to, replacement of a single-sided-cooking-surface cooking plate 201, additional patterns for previously (or currently) offered themes or as a low cost alternative to multiple pattern combinations.

It is noted that, as an alternative, use of one double-sided-cooking-surface cooking plate 601 in which only one double-sided-cooking-surface cooking plate 601 replaces one original manufacturer's double-sided-cooking-surface cooking plate is also illustrated by FIG. 6.

Figure 7:
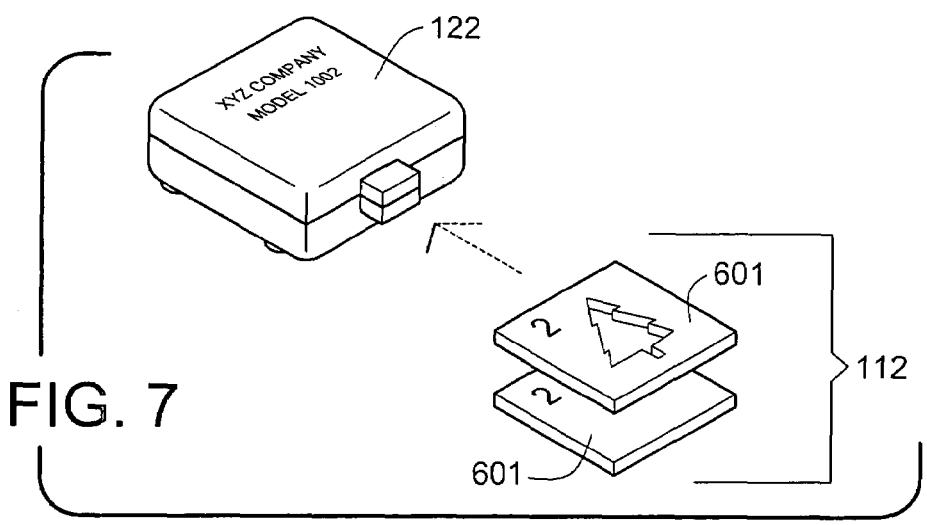
FIG. 7 is a perspective view of a waffle or sandwich-griller with two double-sided-cooking-surface removable cooking plates according to a preferred embodiment of the present invention.

FIG. 7 is a perspective view of a waffle or sandwich griller with two double-sided-cooking-surface removable cooking plates according to a preferred embodiment of the present invention. Referring to FIG. 7, a preferred double-sided-cooking-surface cooking plate 601 combination is presented, in which two or more double-sided-cooking-surface cooking plates 601 are packaged together and sold for use preferably in appliance 122 which will accept two removable double-sided-cooking-surface cooking plates. Preferably, each cooking surface pattern of each double-sided-cooking-surface cooking plate 601 provided in a package will represent the same theme. For example, a preferred package 112 having a winter theme may preferably include three double-sided-cooking-surface cooking plates 601 which have cooking surface patterns representing a snowman, a snow-covered tree and a skier. Certainly, under appropriate circumstances, many other preferred themes and preferred theme-related representational patterns may be designed and sold for appliance(s) 120 with removable double-sided-cooking-surface cooking plates.

Preferably, double-sided-cooking-surface cooking plates 601 may be used in which any one, or a combination of any two, double-sided-cooking-surface cooking plates 601 is provided to replace the original manufacturer's double-sided-cooking-surface cooking plates. Under appropriate circumstances, other arrangements may suffice. For example, more or fewer double-sided-cooking-surface cooking plates 601 may be provided in a package 112. Additionally, double-sided-cooking-surface cooking plates 601 with cooking surface patterns representing different themes in a single package may also be provided.

Figure 8:
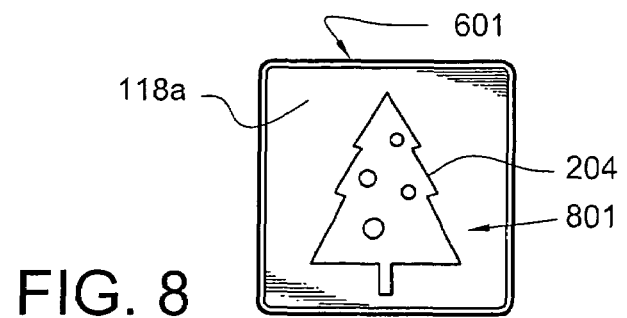
FIG. 8 is a top view of a first surface of a double-sided themed cooking plate according to the preferred embodiment of FIG. 6.
Figure 9:
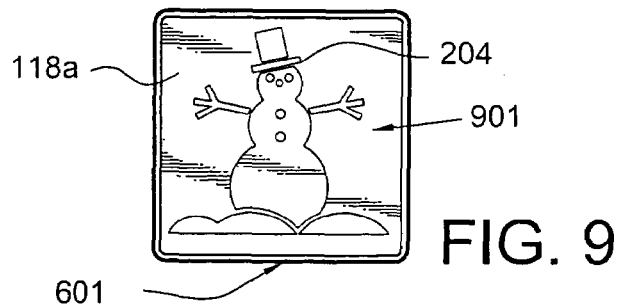
FIG. 9 is a top view of a second surface of a double-sided themed cooking plate according to the preferred embodiment of FIG. 6.

FIG. 8 is a top view of a first surface 801 of double-sided themed cooking plate 601 of FIG. 6. FIG. 9 is a top view of second surface 901 of double-sided themed cooking plate 601 of FIG. 6.

Referring to FIG. 9, the second surface 901 of a preferred double-sided themed cooking plate 601 is presented. As previously described, certain appliance(s) 116 utilize cooking plates that are removable and reversible thereby allowing the appliance 116 to be used for more than one purpose. In the preferred embodiment of FIG. 8 and FIG. 9, double-sided themed cooking plate 601 is reversible between its first surface 801 and second surface 901 to provide two unique themed image representations 204, as shown. Preferably, each respective plate surface comprises non-stick coating 118a.

Figure 10:
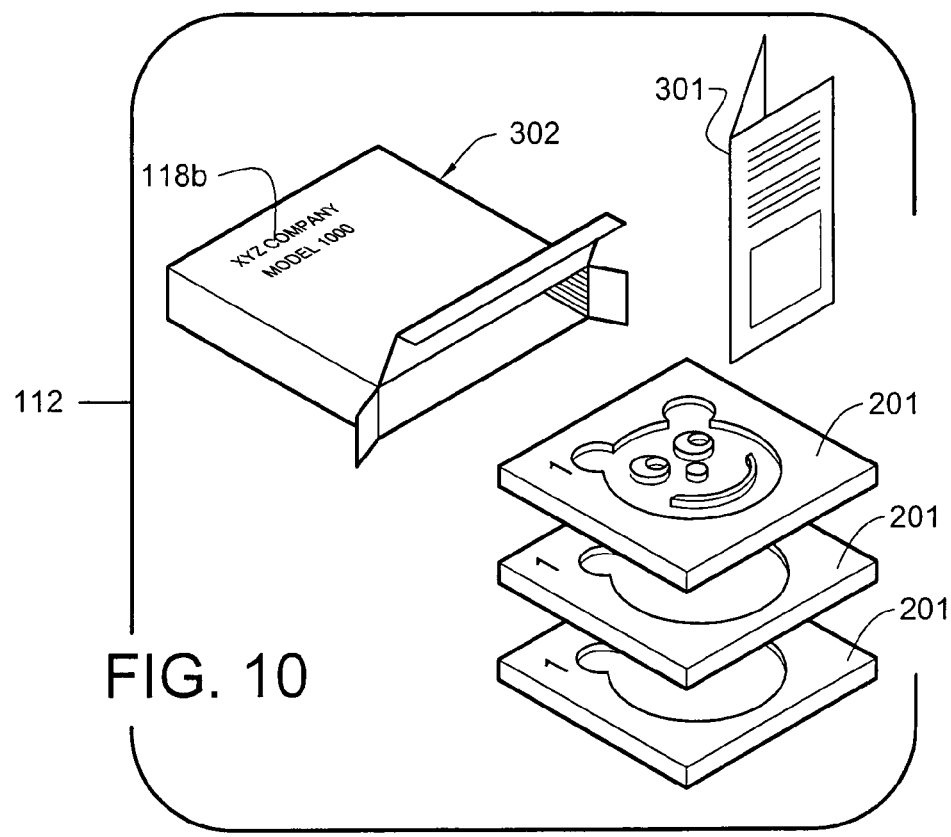
FIG. 10 is a perspective view of a kit with a set of interchangeable single-sided cooking plates having a single theme, according to a preferred embodiment of the present invention.

FIG. 10 is a perspective view of a kit of themed interchangeable single-sided cooking plates according to a preferred embodiment of the present invention. Preferably, one or more single-sided-cooking-surface themed cooking plates 201 along with usage instructions 301 are placed inside container 302. Preferably, each kit comprises a single theme with one or more themed cooking plates 201 (embodying herein wherein such impression system comprises a plurality of cooking plates, each such cooking plate comprising a different image representation of a single motif). Upon reading this specification, those with ordinary skill in the art will understand that, under appropriate circumstances, in consideration of such issues as new consumer markets, user preference, marketing strategies, etc., other theme combinations, such as, for example, providing, a kit containing multiple themes, may suffice.

Preferably, the usage instructions 301 include instructions for installing and removing the cooking plates, cleaning the cooking plates and other pertinent information to assist proper usage and customer satisfaction (embodying herein instruction means for instructing at least one user on usage of such impression system; and, embodying herein instructions to instruct at least one user on usage of such impression system). The preferred container 302 is a box constructed of material of sufficient strength to hold a preferred combination of elements as described herein (embodying herein at least one kit package to contain kit contents; and, embodying herein packaging means for packaging such impression system). Upon reading this specification, those with ordinary skill in the art will understand that, under appropriate circumstances, considering such issues as marketing strategies, user preference, advances in technology, etc., other arrangements for the container, such as, for example, a bag or similar flexible container of sufficient strength to hold the preferred combination of elements, may suffice. Most preferably, container 302 is non-flexible and sturdy. Further, container 302 preferably comprises indicia 118b to identify which particular themed cooking plate 201 will match with a particular brand of appliance 102, such that themed cooking plates 201 will fit the brand identified (embodying herein indicia means for indicating at least one model of at least one manufacturer's cooking appliance; and embodying herein indicia to indicate at least one model of at least one manufacturer's cooking appliance).

Figure 11:
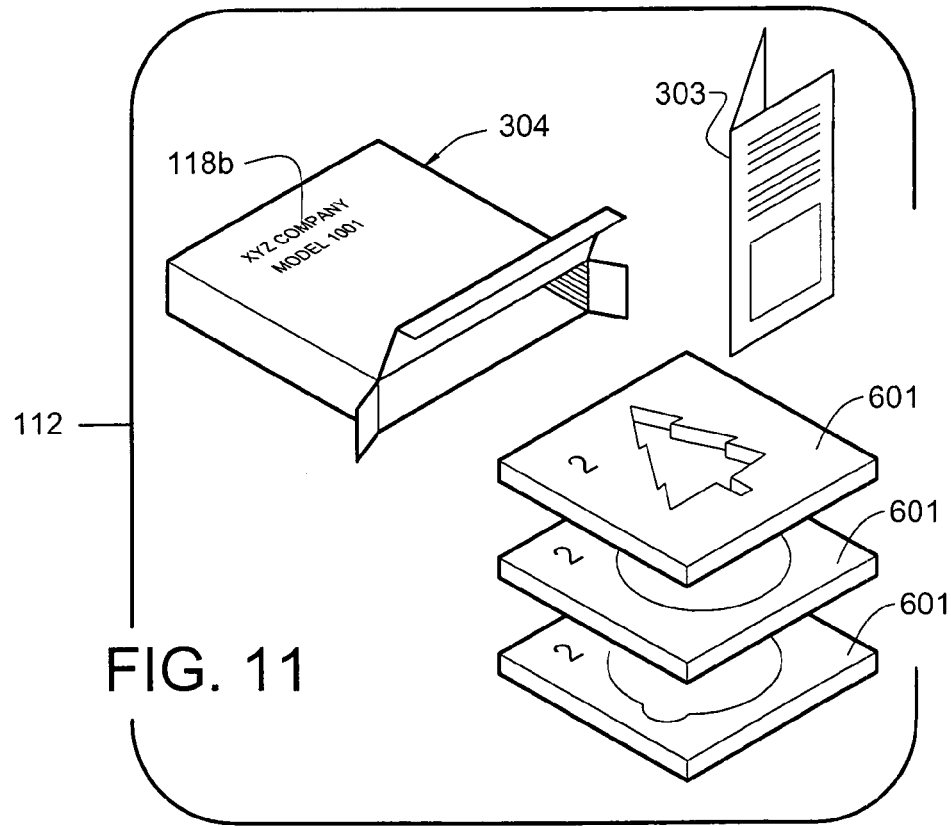
FIG. 11 is a perspective view of a kit with a set of interchangeable double-sided cooking plates having a single theme, according to a preferred embodiment of the present invention.

FIG. 11 is a perspective view of a kit of themed interchangeable double-sided cooking plates according to a preferred embodiment of the present invention. Preferably, one or more double-sided cooking plates 601 are combined in a package 112, along with usage instructions 303 which are placed inside a container 304, preferably a box, preferably constructed of material of sufficient strength to hold a preferred combination of elements, as shown. Preferably, the usage instructions 303 include instructions for installing and removing the cooking plates 601, cleaning the cooking plates 601 and other pertinent information to assist proper usage and customer satisfaction. Under appropriate circumstances, other container arrangements may suffice, as previously discussed. Further, container 304 preferably comprises indicia 118b to identify which particular themed cooking plate 601 will match with a particular brand of appliance 120 or appliance 122, such that themed cooking plates 201 will fit the brand identified (embodying herein indicia means for indicating at least one model of at least one manufacturer's cooking appliance; and embodying herein indicia to indicate at least one model of at least one manufacturer's cooking appliance).

Although Applicant has described applicant's preferred embodiments of this invention, it will be understood that the broadest scope of this invention includes such modifications as diverse shapes and sizes and materials. Such scope is limited only by the below claims as read in connection with the above specification.

Further, many other advantages of applicant's invention will be apparent to those skilled in the art from the above descriptions and the below claims.

What is claimed is:

1. An impression system for transferring heat and at least one image representation to at least one food substance, for use with at least one cooking system of at least one manufacturer, comprising:
   a) impressor means, comprising at least one image representation, for impressing the at least one food substance;
   b) adapter means for adapting said impressor means to the at least one cooking system of the at least one manufacturer; and
   c) heat-transfer means for transferring heat from the at least one cooking system of the at least one manufacturer to the at least one food substance;
   d) wherein said at least one image representation comprises three-dimensional pattern transfer means for transferring at least one three-dimensional pattern onto the at least one food substance; and
   e) wherein said three-dimensional pattern transfer means comprises at least one motif.

2. The impression system according to claim 1 wherein said impressor means comprises at least one cooking plate comprising at least one first side and at least one second side.

3. The impression system according to claim 2 wherein said at least one first side comprises said three-dimensional pattern transfer means.

4. The impression system according to claim 2 wherein said at least one first side and said at least one second side each comprise said negative three-dimensional pattern transfer means.

5. The impression system according to claim 2 wherein said impressor means comprises at least two of said at least one cooking plate, each respective said at least one cooking plate comprising one motif.

6. The impression system according to claim 1 further comprising release means for releasing the at least one food substance from said impressor means.

* * * * *